(12) United States Patent
Oh et al.

(10) Patent No.: US 8,914,608 B2
(45) Date of Patent: Dec. 16, 2014

(54) DATA STORAGE DEVICE AND COMPUTING SYSTEM INCLUDING THE SAME

(75) Inventors: Sang-Jin Oh, Suwon-si (KR); Jeonguk Kang, Bucheon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 943 days.

(21) Appl. No.: 13/025,584

(22) Filed: Feb. 11, 2011

(65) Prior Publication Data

US 2011/0225388 A1 Sep. 15, 2011

(30) Foreign Application Priority Data

Mar. 12, 2010 (KR) .......................... 10-2010-0022361

(51) Int. Cl.
*G06F 12/10* (2006.01)
(52) U.S. Cl.
CPC .................................. *G06F 12/1009* (2013.01)
USPC ................... 711/202; 711/206; 711/E12.058
(58) Field of Classification Search
CPC .................................................. G06F 12/1009
USPC .................................................. 711/202, 206
See application file for complete search history.

(56) References Cited

U.S. PATENT DOCUMENTS

| 2001/0012222 | A1* | 8/2001 | Terasaki ......................... 365/200 |
| 2007/0300037 | A1* | 12/2007 | Rogers et al. ................. 711/202 |
| 2008/0016295 | A1* | 1/2008 | Yim et al. ..................... 711/156 |
| 2009/0049229 | A1* | 2/2009 | Honda et al. .................. 711/101 |
| 2009/0172466 | A1 | 7/2009 | Royer et al. |
| 2010/0125694 | A1* | 5/2010 | Choi ................................ 711/1 |

FOREIGN PATENT DOCUMENTS

| JP | 2005222202 A | 8/2005 |
| KR | 20030040817 A | 5/2003 |
| KR | 20050024322 A | 3/2005 |

* cited by examiner

*Primary Examiner* — Christian P Chace
*Assistant Examiner* — Aracelis Ruiz
(74) *Attorney, Agent, or Firm* — Harness, Dickey & Pierce, P.L.C.

(57) ABSTRACT

A data storage device includes a storage medium configured to store data; and a controller configured to control the storage medium, the controller including address mapping information. The controller is configured to divide the address mapping information into at least a first address mapping table and a second address mapping table based on information regarding temporary data received at the controller. The first address mapping table is configured to map one or more addresses of valid data and to be backed up to the storage medium. The second mapping address table being configured to map one or more addresses of the temporary data and to not be backed up to the storage medium.

20 Claims, 8 Drawing Sheets

DATA STORAGE DEVICE AND COMPUTING SYSTEM INCLUDING THE SAME

CROSS-REFERENCE TO RELATED APPLICATIONS

This application claims the benefits, under 35 U.S.C. §119, to Korean Patent Application No. 10-2010-0022361 filed Mar. 12, 2010, in the Korean Intellectual Property Office (KIPO) the entire contents of which are incorporated by reference herein.

BACKGROUND

1. Field

Example embodiments relate to an electronic device, and more particularly, relate to a data storage device and a computing system including the same.

2. Description of the Related Art

The paradigm on recent computer environment has been turned into ubiquitous computing environment in which it is possible to use computing systems anywhere and anytime. This promotes increasing usage of portable electronic devices such as portable media player (PMP), digital camera, notebook computer, and the like. Such portable electronic devices may include a data storage device using memory devices instead of hard disk drive.

As a data storage device using memory devices, Solid State Drive (hereinafter, referred to as SSD) is a data storage device which uses memory devices as storage media. SSD is able to be used like hard disk drive through a host interface (for example, PATA, SATA, etc.) which is being used at a conventional data storage device. Since SSD does not have mechanical driving part, its stability and persistence are excellent as compared to conventional hard disk drive. Further, SSD has advantages that an access speed is higher and that power consumption is less.

SSD may be divided according to storage media types. For example, the first type of SSD uses volatile memory devices as storage media, and the second type of SSD uses non-volatile memory devices as storage media. The first type of SSD uses high-speed volatile memory devices (for example, SDRAM) as storage media. A data access speed of the first type of SSD is remarkably speedy. Accordingly, the first type of SSD may be used to increase speeds of applications. The first type of SSD may include an internal battery and a back disk system in order to maintain data during a given time.

The second type of SSD uses mass non-volatile memory devices (for example, flash memory device) as storage media. In case of the second type of SSD, it is easy to increase storage capacity. Accordingly, the second type of SSD may be used to replace a hard disk drive.

SUMMARY

According to example embodiments of the inventive concepts, a data storage device may include a storage medium configured to store data; and a controller configured to control the storage medium, the controller including address mapping information.

The controller may be configured to divide the mapping information into at least a first address mapping table and a second address mapping table based on information regarding the temporary data received at the controller, the first address mapping table being configured to map one or more addresses of valid data and to be backed up to the storage medium, the second mapping address table being configured to map one or more addresses of temporary data and to not be backed up to the storage medium.

According to example embodiments of the inventive concepts, a method for handling data storage in a system including a host, a storage medium configured to store data, and a controller configured to control the storage medium may include obtaining information regarding temporary data at the controller, and dividing address mapping information included in the controller into at least a first address mapping table and a second address mapping table based on the obtained information.

The first address mapping table may be configured to map one or more addresses of valid data and to be backed up to the storage medium, and the second mapping address table may be configured to map one or more addresses of temporary data and to not be backed up to the storage medium.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
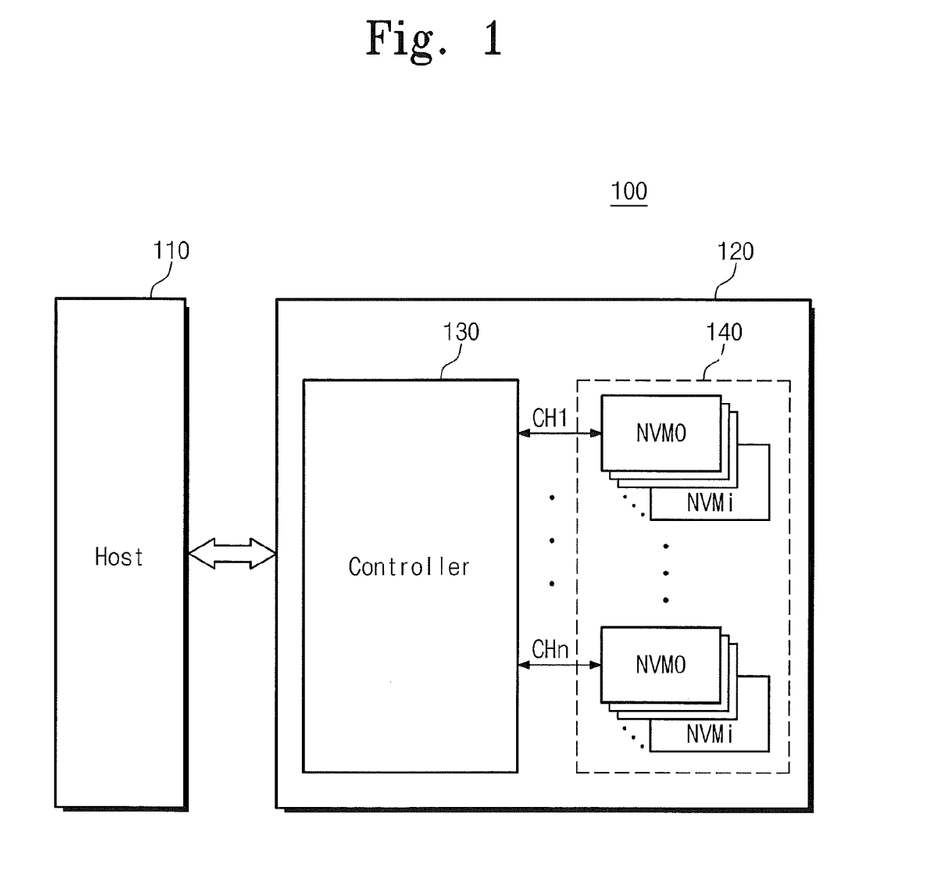
FIG. 1 is a block diagram showing a computing system according to example embodiments of the inventive concepts.

FIG. 1 is a block diagram showing a computing system according to example embodiments of the inventive concepts.

Referring to FIG. 1, a computing system 100 includes a host 110 and a data storage device 120. The host 110 is configured to control the data storage device 120. The host 110 includes portable electronic devices such as PDA, PMP, MP3, player, and the like or electronic devices such as personal/portable computer, HDTV, and the like, for example.

The data storage device 120 operates responsive to the control of the host 110. The data storage device 120 maintains stored data even at power-off. The data storage device 120 may be, for example, a Solid State Drive (SSD). However, the data storage device 120 is not limited to the SSD. For example, the data storage device 120 may be a data storage device using memory devices, like a memory card.

The data storage device 120 includes a controller 130 and a storage medium 140. The controller 130 controls the storage medium 140 in response to a request from the host 110. For example, the controller 130 may control read, write and erase operations of the storage medium 140 in response to an access request of the host 110.

The controller 130 is connected with the storage medium 140 via a plurality of channels CH1 to CHn. The storage medium 140 may include a plurality of non-volatile memory devices. Each of the channels CH1 to CHn may be connected with a plurality of non-volatile memory devices NVM0 to NVMi. The storage medium 140 may be formed of a plurality of flash memory devices, for example. However, according to example embodiments of the inventive concepts, the storage medium 140 may be formed of non-volatile memory devices other than the flash memory devices. For example, the storage medium 140 may be formed of one of non-volatile memory devices including Phase-change RAM (PRAM), Ferroelectric RAM (FRAM), Magnetic RAM (MRAM), and the like.

Each flash memory device of the storage medium 140 may store single-bit data or multi-bit data. A memory cell storing single-bit data is called a Single Level Cell (SLC), and a memory cell storing data of two or more bits is called a Multi-Level Cell (MLC). The SLC has any one of an erase state and a program state according to its threshold voltage. The MLC has any one of an erase state and a plurality of program states according to its threshold voltage.

With the computing system 100, the host 110 notifies the data storage device 120 by providing information regarding temporary data among data (or, files), for example, files, stored in the data storage device 120 as needed. This is accomplished by sending a specific command to the data storage device 120. Hereinafter, the specific command is called a Temporary Data Management (TDM) command. The TDM command provides information regarding data which causes minimal or no errors in the host 110 when it is deleted, among data stored in the data storage device 120. For example, the TDM command may include address information (for example, logical address information) of temporary data the deletion of which results in minimal or no errors at the host.

When the TDM command is provided from the host 110, the data storage device 120 may reconfigure an address mapping table, which is used to map a logical address to a physical address, according to the TDM command. For example, the data storage device 120 may configure an address mapping table for mapping logical address of temporary data only, independently from an address mapping table for mapping logical address of permanent (or, valid) data.

The address mapping table for mapping logical addresses of temporary data may be stored in a working memory 135 (refer to FIG. 2) of the data storage device 120. When an operation of the computing system is terminated, or upon system termination, an address mapping table stored in the working memory 135 is stored (or backed up) in the storage medium 140. Alternatively, in order to cope with sudden power-off of the computing system 100, an address mapping table stored in the working memory 135 is stored (or, backed up) in the storage medium 140 periodically or as needed.

According to example embodiments of the inventive concepts, an address mapping table, which is used to map logical addresses of temporary data and is configured responsive to the TDM command, is not backed up or stored in the storage medium 140. This will be more fully described with reference to FIG. 6. This means that an address mapping table to be stored is reduced in size. For this reason, the data storage device 120 is capable of processing a host request within a rapid time. That is, the data storage device 120 may be capable of reducing a response time on a host request. This may enables the performance of the data storage device 120 or the computing system 100 to be enhanced. Further, since an address mapping table to be stored is reduced in size, it is possible to reduce an erase-write cycle of a flash memory device in the storage medium 140.

Figure 2:
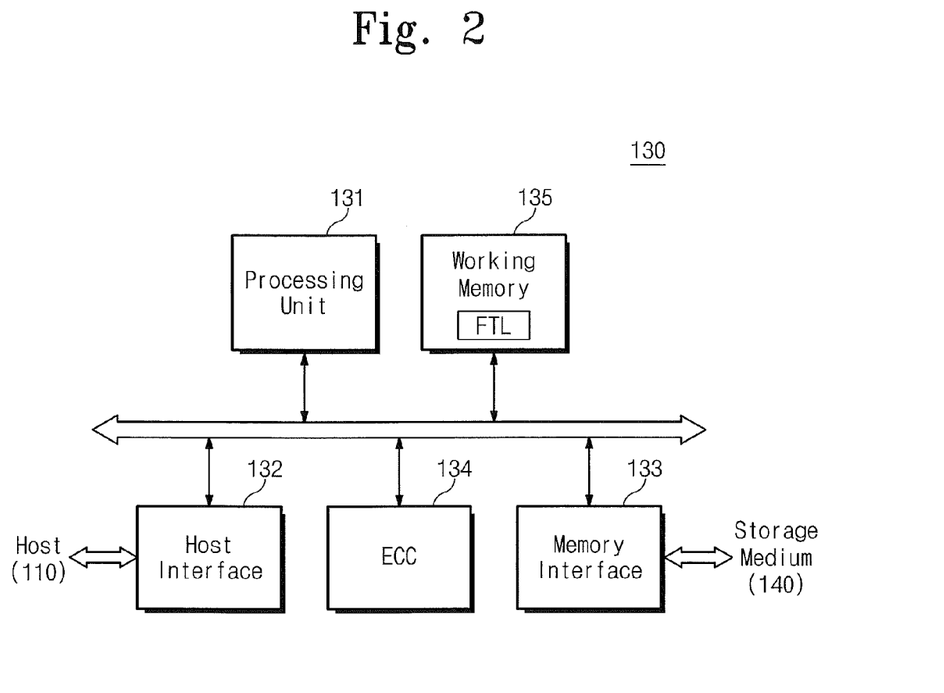
FIG. 2 is a block diagram showing a controller illustrated in FIG. 1 according to example embodiments of the inventive concepts.

FIG. 2 is a block diagram showing a controller illustrated in FIG. 1 according to example embodiments of the inventive concepts.

Referring to FIG. 2, a controller 130 includes a processing unit 131, a host interface 132, a memory interface 133, an ECC unit 134, and a working memory 135. However, FIG. 2 is only an example structure of the controller 130 and, according to example embodiments, controller 130 may have other structures. For example, the controller 130 may further comprise ROM for storing code data needed for an initial booting operation, a buffer memory controller for controlling a buffer memory, and the like.

The processing unit 131 includes a central processing unit or a micro-processor. The processing unit 131 controls an overall operation of the controller 130. For example, the processing unit 131 may be configured to drive firmware for controlling the controller 130. The firmware may be loaded and driven at the working memory 135.

The host interface 132 provides an interface between a host 110 and the controller 130. The host 110 and the controller 130 may be connected, for example, via a standardized interface. Alternatively, the host 110 and the controller 130 may be connected via multiple standardized interfaces. Examples of standardized interfaces which may be used include Advanced Technology Attachment (ATA), Serial ATA (SATA), external SATA (e-SATA), Small Computer Small Interface (SCSI), Serial attached SCSI (SAS), Peripheral Component Interconnection (PCI), PCI express (PCI-E), Universal Serial Bus (USB), IEEE 1394, and Card interfaces.

The memory interface 133 provides an interface between the controller 130 and the storage medium 140. For example, data processed by the processing unit 131 is stored in the storage medium 140 via the memory interface 133. As another example, data stored in the storage medium 140 is provided to the processing unit 131 via the memory interface 133. The memory interface 133 includes a memory controller which controls the storage medium 140. Further, the memory interface 133 is able to provide an interface between the controller 130 and a buffer memory device (not shown).

The ECC unit 134 recovers data damaged due to various causes. For example, the ECC unit 134 is configured to detect and recover errors of data read out from the storage medium 140. In FIG. 2, the ECC unit 134 is illustrated as an element of the controller 130. But, the ECC unit 134 is capable of being provided as an element of the storage medium 140.

Firmware for controlling the controller 130 and data are stored in the working memory 135. The working memory 135 may include at least one of a cache memory, a DRAM, an SRAM, a PRAM, and a flash memory device. With example embodiments of the inventive concepts, a flash translation layer (FTL) is stored in the working memory 135.

Figure 3:
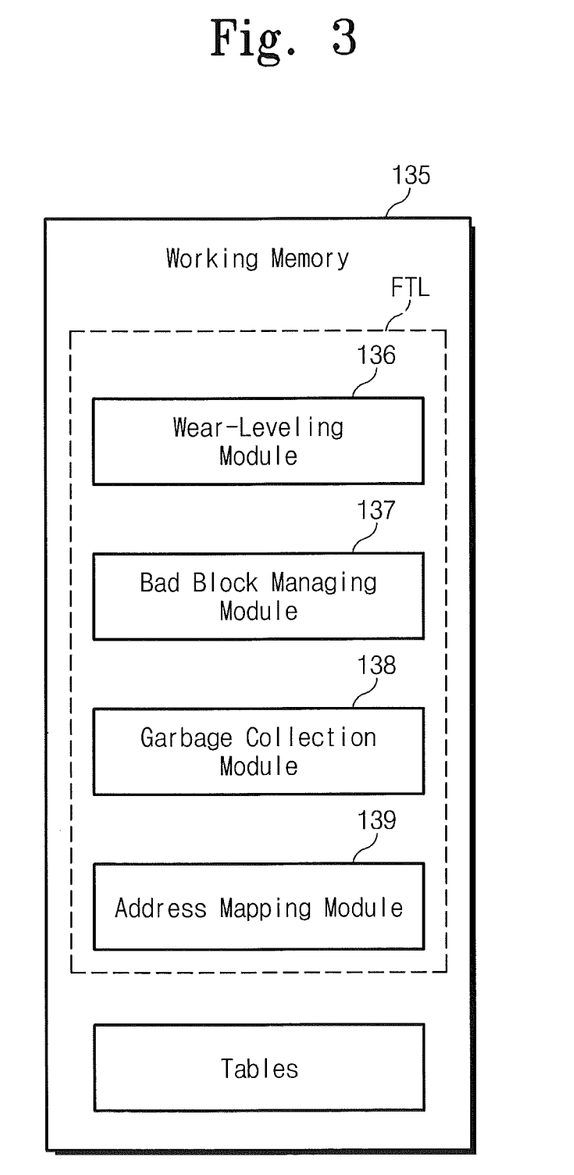
FIG. 3 is a block diagram showing a flash translation layer according to example embodiments of the inventive concepts.

FIG. 3 is a block diagram showing a flash translation layer according to example embodiments of the inventive concepts.

A flash memory device of a storage medium 140 (refer to FIG. 1) may perform a read or write operation by a page unit and an erase operation by a block unit, due to a structural characteristic of the flash memory device. Herein, a page includes a plurality of memory cells, and a block includes a plurality of pages. Further, an erase operation precedes an operation of writing new data in a memory cell in which data was previously stored. It is necessary to manage read, write, and erase operations of the flash memory device because of the above-described characteristics. A Flash Translation Layer FTL is system software (or, firmware) which is developed to that end. The FTL is loaded on a working memory 135 so as to be driven by a processing unit 131 (refer to FIG. 3).

Referring to FIG. 3, the FTL includes a plurality of modules, that is, a wear-leveling module 136, a bad block managing module 137, a garbage collection module 138, and an address mapping module 139. However, the FTL is not limited the example illustrated in FIG. 3. For example, according to example embodiments of the inventive concepts, the FTL may further comprise a sudden power-off managing module which copes with unexpected power-off.

The wear-leveling module 136 manages the wear-level on blocks of a flash memory device. Memory cells of the flash memory device are aged due to write and erase operations. Aged memory cells, that is, worn-out memory cells may cause defects, (for example, physical detects). The wear-leveling module 136 manages an erase-write cycle number of each block so as to be leveled. As a result, any one block may be prevented from being worn our more rapidly than other blocks.

The bad block managing module 137 manages defective blocks among blocks of the flash memory device. As above mentioned, worn-out memory cells are able to cause detects (for example, physical detects). It may be difficult or impossible to read normal data from detective memory cells. Further, it may be difficult or impossible to store normal data in detective memory cells. The bad block managing module 137 is used to prevent detective blocks from being used.

The garbage collection module 138 arranges blocks in which fragmented data is stored. A flash memory device may need a collection operation for collecting continuous data, dispersed at physically different positions, at the same address space using any empty/free block(s). The garbage collection module 138 performs an operation of collecting fragmented data at the same address space, which is accomplished by performing a plurality of write operations and a plurality of block erase operations.

In a case where a host 110 (refer to FIG. 1) accesses a data storage device 120 (refer to FIG. 1), the host 110 provides a logical address to the data storage device 120. A controller 130 converts the provided logical address into a physical address of the flash memory device. This may be made through the address mapping module 139 of the FTL. Correspondence of logical to physical addresses is managed by the address mapping module 139. Hereinafter, the correspondence of logical to physical addresses is stored in a table (for example, an address mapping table) as address translation data. As shown in FIG. 3, various tables may be stored in the working memory 135 together with the address mapping table.

Figure 4:
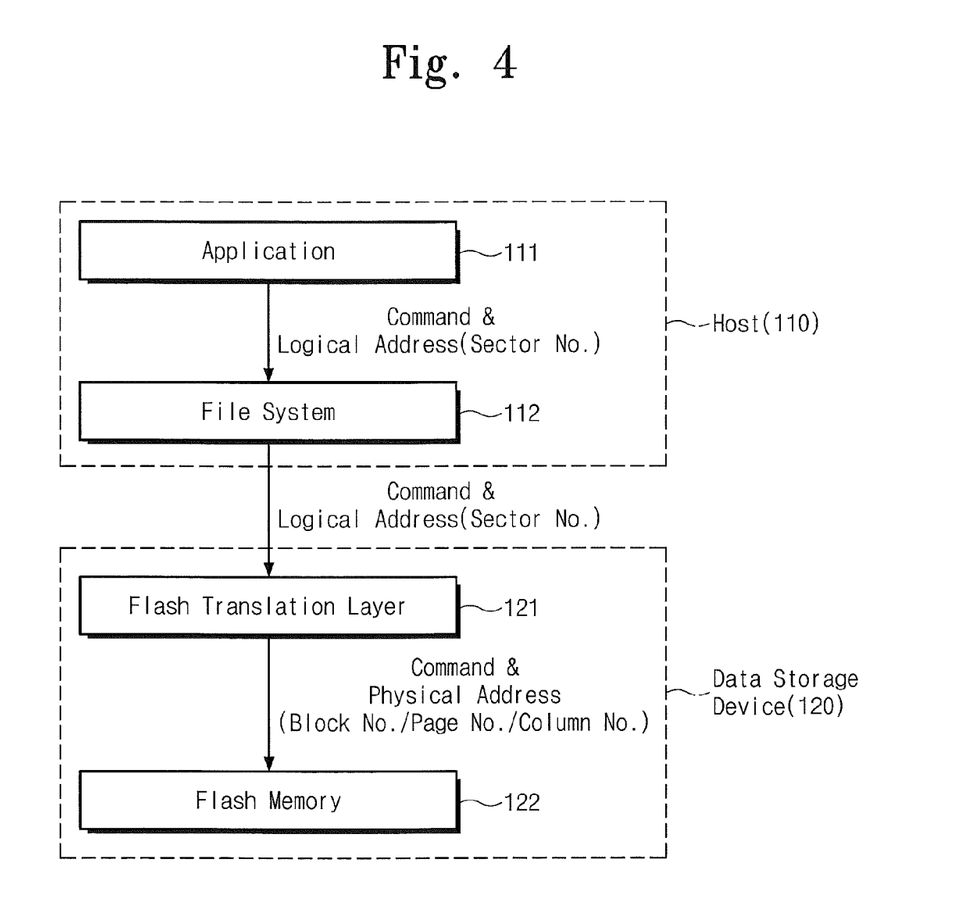
FIG. 4 is a diagram showing the software layer architecture of a computing system illustrated in FIG. 1.

FIG. 4 is a diagram showing the software layer architecture of a computing system illustrated in FIG. 1.

Referring to FIG. 4, a host 110 includes an application (or, an operating system) 111 and a file system 112, and a data storage device 120 includes a software layer having FTL 121 and a hardware layer having a flash memory device 122.

In a case where the file system 112 receives a read or write request from the application 111, the file system 112 sends a logical address (or, a sector address) of a target to be read or written together with a command to the FTL 121. The FTL 121 transfers the received command to the flash memory device 122. Further, the FTL 121 converts the received logical address into a physical address of the flash memory device 122 to send the physical address to the flash memory device 122. The physical address of the flash memory device 122 may include a block number, a page number, or a column number.

The host 110 accesses the data storage device 120 through a logical address. As compared with a physical storage location, the logical address refers to any location of a logical memory space recognized by host software (for example, an operating system or application). Read or write addresses provided from the host 110 don't correspond to physical addresses of the flash memory device 122 one to one. Accordingly, a logical address is converted into a physical address corresponding to physical memory space of the flash memory device 122 in order to access an appointed physical memory space.

The data storage device 120 (or, a flash memory storage device) using flash memory devices may need disk emulation software in order to secure compatibility with the host 110 during an access operation. Upon accessing, the compatibility between the host 110 and the data storage device 120 using flash memory devices may be accomplished by operating the firmware such as FTL 121. In other words, the host 110 recognizes the data storage device 120 as Hard Disk Drive (HDD) and accesses the data storage device 120 in the same manner as the HDD. The FTL 121 connects the flash memory storage device to a file system which is used by an operating system of a computing system. The FTL 121 enables the data storage device 120 to be recognized as the HDD via a file system of the host 110.

Figure 5:
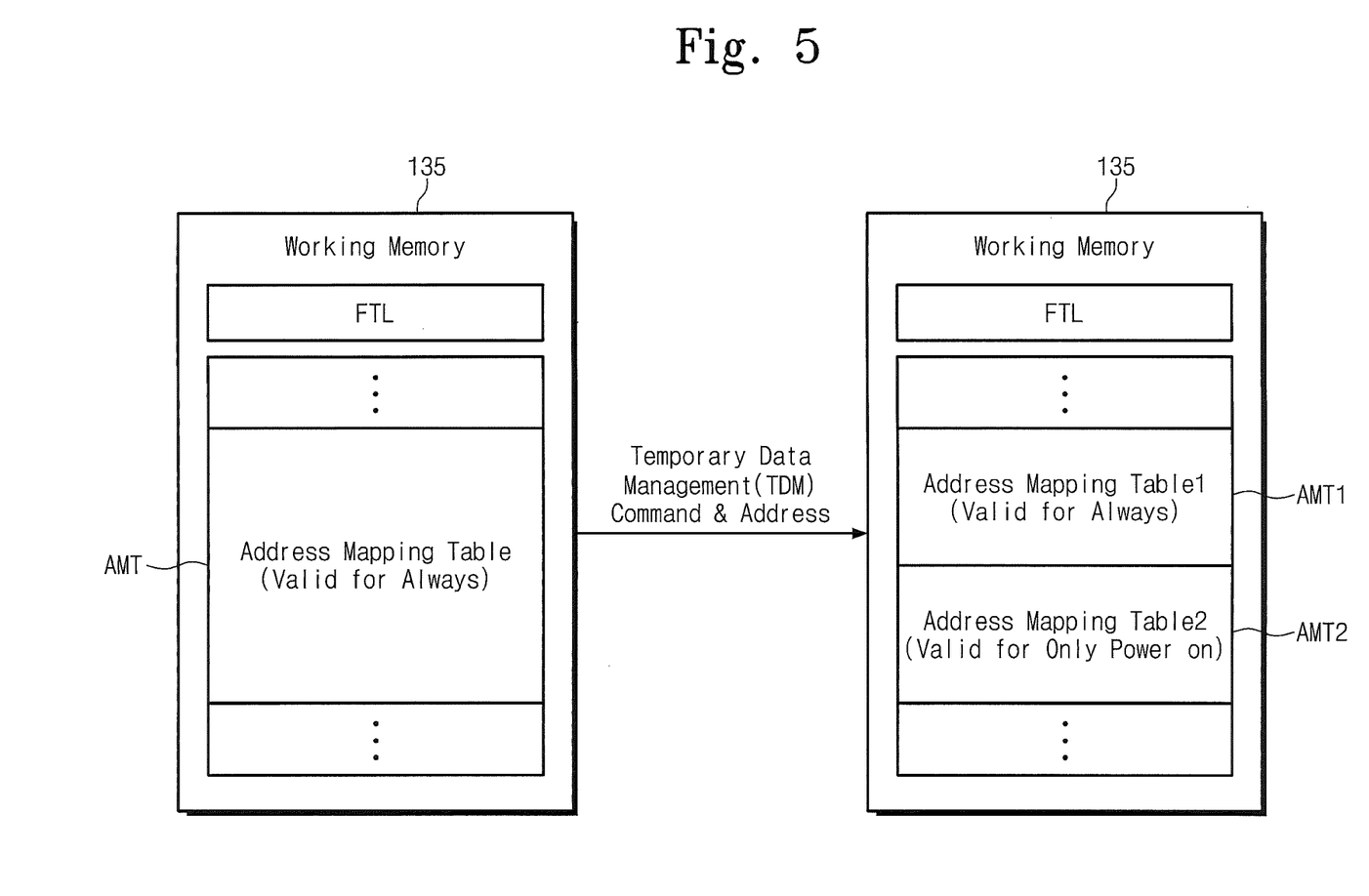
FIG. 5 is a diagram showing an address mapping table when a Temporary Data Management (TDM) command according to example embodiments of the inventive concepts is provided.

FIG. 5 is a diagram showing an address mapping table when a TDM command according to example embodiments of the inventive concepts is provided.

In FIG. 5, there are shown address mapping tables before and after a Temporary Data Management (TDM) command is provided. A host 110 (refer to FIG. 1) provides information, related to temporary data of data (or, files) stored in a data storage device 120 (refer to FIG. 1), to the data storage device 120. This is accomplished by sending a TDM command to the data storage device 120. A transfer of the TDM command may be made using a vendor command transfer manner which is provided by a host interface standard, for example.

The TDM command may include logical address information of temporary data. Logical address information of temporary data may be sent with the TDM command. Alternatively, logical address information of temporary data may be sent after the TDM command is sent. Still alternatively, logical address information of temporary data may be sent before the TDM command is sent.

The working memory 135 may include one address mapping table AMT for mapping logical addresses to physical addresses until the TDM command is sent from the host 110. A computing system 100 (refer to FIG. 1) may have serious errors when the address mapping table AMT is destroyed. Accordingly, the address mapping table AMT may be preserved as valid data not only during power-on of the computing system 100 but also during power-off thereof.

If the TDM command and logical address information of temporary data are sent, the FTL (or, an address mapping module 139 of the FTL) reconfigures the address mapping table AMT so as to be divided into at least two address mapping tables AMT1 and AMT2. That is, the FTL reconfigures the address mapping table AMT referring to logical address information of temporary data sent with the TDM command. As shown in FIG. 5, the address mapping table AMT is divided into two address mapping tables AMT1 and AMT2 under the control of the FTL (or, an address mapping module 139 of the FTL). The address mapping table AMT1 is configured to map logical addresses of permanent (or, valid) data and is preserved as valid data not only during power-on of the computing system 100 but also during power-off thereof.

The address mapping table AMT2 is configured to map logical addresses of temporary data only and is preserved as valid data only during power-on of the computing system 100. For example, the address mapping table AMT2 may preserve temporary data as valid while the power of the computing system 100 is on, and not while the power of the computer system 100 is off. The address mapping table AMT1 for permanent (or, valid) data and the address mapping table AMT2 for temporary data are configured to be separated each other. The address mapping table AMT2 is preserved as valid data only during power-on of the computing system 100. As described above, configuration and reconfiguration of address mapping tables are made via the FTL (or, the address mapping module 139 of the FTL).

Figure 6:
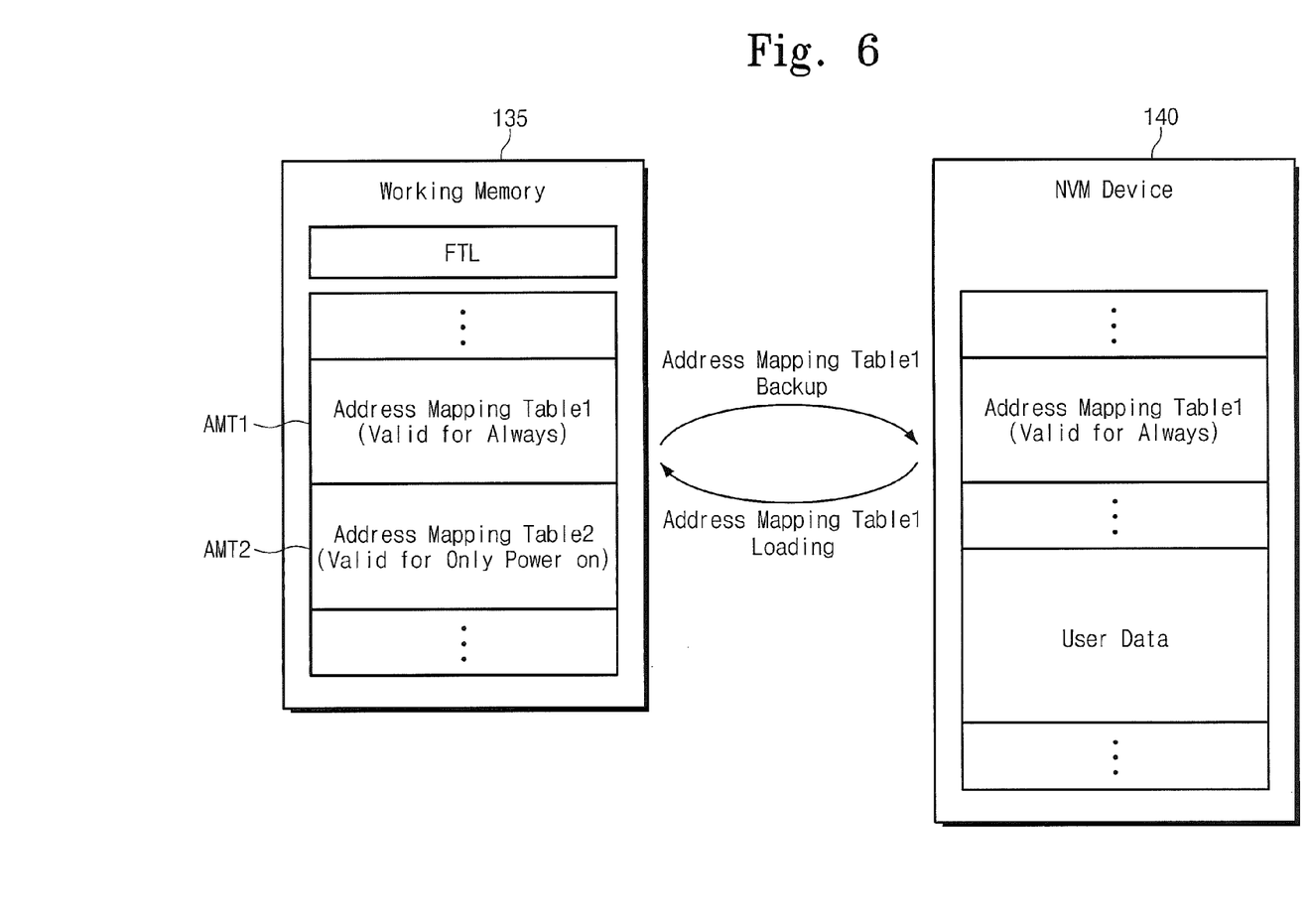
FIG. 6 is a diagram showing an operation of storing an address mapping table when a Temporary Data Management (TDM) command according to example embodiments of the inventive concepts is provided.

FIG. 6 is a diagram showing an operation of storing an address mapping table when a Temporary Data Management (TDM) command according to example embodiments of the inventive concepts is provided.

Referring to FIG. 6, a working memory 135 on which a FTL is loaded, is a volatile memory. For example, the working memory 135 may be formed of a volatile memory device such as DRAM or SRAM, or the like.

Since the FTL is loaded on a volatile memory device, meta data of the FTL may be stored (or, backed up) in a storage medium 140. Herein, the meta data of the FTL may include an address mapping table which is updated when data is transferred from a host 110 (refer to FIG. 1).

As described above, if an operation of the computing system 100 (refer to FIG. 1) is terminated, for example, upon system termination, an address mapping table stored in the working memory 135 is stored in the storage medium 140. Alternatively, an address mapping table stored in the working memory 135 is stored in the storage medium 140 periodically or as needed in order to cope with sudden power-off of the computing system 100. An address mapping table stored in the storage medium 140 is loaded on the working memory 135 when a power is supplied to the computing system 100.

Although supplying of a power to the computing system 100 is interrupted, it is desirable to preserve the address mapping table AMT1 for permanent (or, valid) data. Accordingly, the address mapping table AMT1 for permanent (or, valid) data may be stored (or, backed up) in the storage medium 140. Further, the address mapping table AMT1 for permanent (or, valid) data stored in the storage medium 140 is loaded on the working memory 135 when a power is again supplied to the computing system 100 (for example, at a system start or at re-booting).

On the other hand, in a case where supplying of a power to the computing system 100 is interrupted, the address mapping table AMT2 for temporary data configured according to the TDM command may be destroyed. This means that the address mapping table AMT2 for temporary data is not stored (or, backed up) in the storage medium 140.

Although the address mapping table AMT2 for temporary data is destroyed, errors of the computing system 100 are not caused. Further, since the address mapping table AMT2 for temporary data is not stored in the storage medium 140, it is not loaded on the working memory 135 when a power is again supplied to the computing system 100 (for example, at a system start or at re-booting).

With example embodiments of the inventive concepts, an address mapping table may be divided into an address mapping table AMT1 for permanent data and an address mapping table AMT2 for temporary data according to the TDM command. Since the address mapping table AMT2 is a table which is valid during power-on of the computing system 100, it is not stored in the storage medium 140. This means that there is reduced a size of an address mapping table to be stored in the storage medium 140. Accordingly, storing/backup of an address mapping table may be made with a rapid time. This means that a response on a request of a host 110 is made rapidly by the data storage device 120. That is, a response time on a request of the host 110 is reduced. This enables the performance of the data storage device 120 or the computing system 100 to be enhanced. Further, since there is reduced a size of an address mapping table to be stored, an erase-write cycle number of a flash memory device in the storage medium 140 may be reduced.

Figure 7:
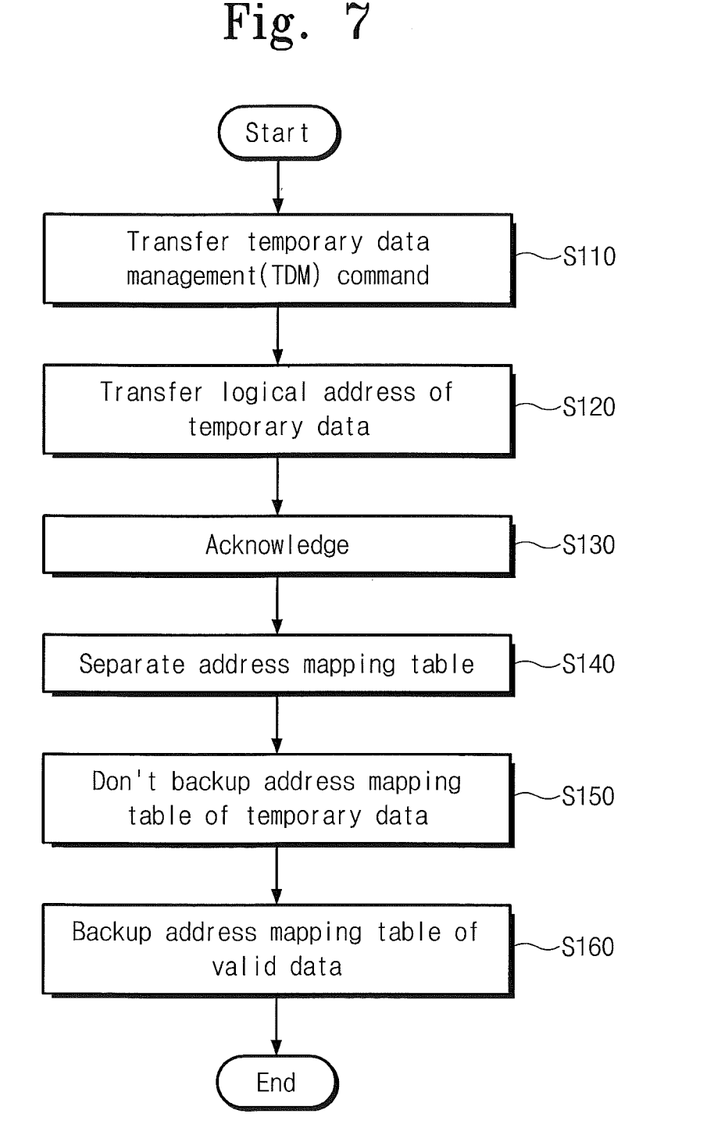
FIG. 7 is a flow chart for describing an operation of a data storage device according to the first embodiment of the inventive concept.

FIG. 7 is a flow chart for describing an operation of a data storage device according to the first example embodiment of the inventive concepts. Below, an operation of a data storage device according to the first embodiment of the inventive concept will be more fully described with reference to accompanying drawings.

A host 110 provides a TDM command to a data storage device 120 as needed. For example, the TDM command is used to notify to the data storage device 120 information of temporary data of data (or, files) stored in the data storage device 120. In step S110, the TDM command is sent to the data storage device 120 from the host 110. In step S120, logical address information of temporary data is sent to the data storage device 120 from the host 110 together with the TDM command. As described above, logical address information of temporary data is sent after the TDM command is sent. In another embodiment, logical address information of temporary data is sent together with the TDM command. That is, the TDM command may include logical address information of temporary data.

In step S130, a controller 130 notify the host 110 that the TDM command and logical address information of temporary data are received. Afterwards, in step S140, the controller 130 (or, software driven by the controller 130) reconfigures an address mapping table with reference to logical address information of temporary data. That is, an address mapping table is divided into address mapping tables AMT1 and AMT2 under the control of the controller 130. The address mapping table AMT1 is used to manage permanent (or, valid) data which is preserved as valid data during power-on and power-off of the computing system 100. The address mapping table AMT2 is used to manage temporary data which is preserved as valid data only during power-on of the computing system 100. The address mapping table AMT2 for temporary data is configured to be independent from the address mapping table AMT1 for permanent (or, valid) data.

An address mapping table stored in a working memory 135 may be updated when data is transferred from the host 110. In the event that the computing system 100 is terminated (that is, upon system termination), the address mapping table is stored in the storage medium 140. Alternatively, the address mapping table is stored in the storage medium 140 periodically or as needed to cope with sudden power-off of the computing system 100. Since an address mapping table of temporary data configured according to the TDM command is a table which is valid only during power-on of the computing system 100, in step S150, it is not stored (or, backed up) in the storage medium 140. On the other hand, the address mapping table of permanent (or, valid) data is stored (or, backed up) in the storage medium 140, in step S160. The address mapping table of permanent (or, valid) data is loaded on the working memory 135 at power-up, and is referred by the controller 130.

Figure 8:
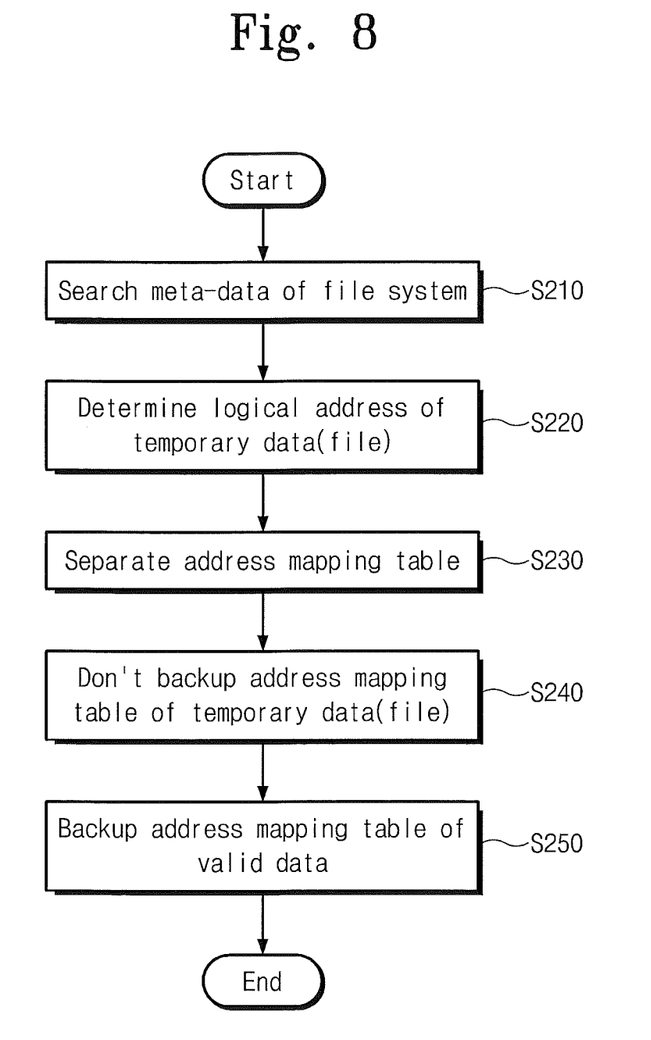
FIG. 8 is a flow chart for describing an operation of a data storage device according to the second embodiment of the inventive concept.

FIG. 8 is a flow chart for describing an operation of a data storage device according to a second example embodiment of the inventive concepts. Below, an operation of a data storage device according to the second embodiment of the inventive concept will be more fully described with reference to accompanying drawings.

An operating system of a computing system 100 may manage a File Allocation Table (FAT) in order to maintain and manage files (or, data) stored in a data storage device 120. The FAT is stored in the data storage device 120 and is loaded onto the host 110 as needed. In step S210, a controller 130 (or, software operated by the controller 130) searches meta data managed by the file system of the host 110 such as the FAT. That is, the controller 130 searches information related to temporary data of data (or, files) stored in a storage medium 140.

The controller 130 searches meta data managed by the file system to extract temporary data (or, files). Although the temporary data is destroyed at power-off (for example, at system termination or sudden power-off), it does not cause system errors. For example, the temporary data may include paging files used by a paging technology or internet temporary files. If temporary data is extracted, in step S220, the controller 130 determines a logical address of the extracted temporary data.

Afterwards, in step S230, the controller 130 reconfigures an address mapping table with reference to logical address information of temporary data. That is, an address mapping table is divided into address mapping tables AMT1 and AMT2 under the control of the controller 130. The address mapping table AMT1 is used to manage permanent (or, valid) data which is preserved as valid data during power-on and power-off of the computing system 100. The address mapping table AMT2 is used to manage temporary data which is preserved as valid data only during power-on of the computing system 100. The address mapping table AMT2 for temporary data is configured to be independent from the address mapping table AMT1 for permanent (or, valid) data. Configuration of address mapping tables may be conducted in the same manner as described in FIG. 5.

An address mapping table stored in a working memory 135 may be updated when data is transferred from the host 110. In the event that the computing system 100 is terminated (that is, upon system termination), the address mapping table is stored in the storage medium 140. Alternatively, the address mapping table is stored in the storage medium 140 periodically or as needed to cope with sudden power-off of the computing system 100. Since an address mapping table of temporary data configured according to extraction of temporary data stored in the storage medium 140 is a table which is valid only during power-on of the computing system 100, in step S240, it is not stored (or, backed up) in the storage medium 140. On the other hand, the address mapping table of permanent (or, valid) data is stored (or, backed up) in the storage medium 140, in step S250. The address mapping table of permanent (or, valid) data is loaded on the working memory 135 at power-up, and is referred by the controller 130. Storing of address mapping tables may be conducted in the same manner as described in FIG. 6.

According to example embodiments of the inventive concepts, an address mapping table is divided into an address mapping table for permanent (or, valid) data and an address mapping table for temporary data. Division/separation into address mapping tables may be made according to a TDM command provided from a host 110. In another embodiment, division/separation into address mapping tables may be made by searching temporary data stored in the storage medium 140.

Since the address mapping table for temporary data is a table which is valid during power-on of the computing system 100, it is not stored (or, backed up) in the storage medium memory 140. This means that there is reduced a size of an address mapping table to be stored in the storage medium 140. Accordingly, storing/back-up of an address mapping table may be made with a rapid time. This means that a response on a request of a host 110 is made rapidly by the data storage device 120. That is, a response time on a request of the host 110 is reduced. This enables the performance of the data storage device 120 or the computing system 100 to be enhanced. Further, since there is reduced a size of an address mapping table to be stored, an erase-write cycle number of a flash memory device in the storage medium 140 may be reduced.

Although not shown in figures, a data storage device may be configured to perform an address mapping table managing method which includes configuring the first address mapping table for managing the first type of data causing system errors when it is destroyed; detecting whether the second type of data not causing system errors when it is destroyed exists; and if detected, configuring the second address mapping table independently from the first address mapping table. Upon normal or abnormal system termination, the second address mapping table is not stored in a storage medium 140. In an example embodiment of the inventive concepts, the detecting is accomplished by receiving information related to the second type of data from a host or searching information, related to the second type of data, from meta data stored in the storage medium 140.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A data storage device comprising:
a storage medium configured to store data; and
a controller configured to control the storage medium, the controller including address mapping information,
wherein the controller is configured to divide the address mapping information into at least a first address mapping table and a second address mapping table based on information regarding temporary data received from a hosting device, the first address mapping table being configured to map one or more addresses of valid data and to be backed up to the storage medium, the second mapping address table being configured to map one or more addresses of the temporary data and to not be backed up to the storage medium,
wherein the first address mapping table translates logical addresses to physical addresses of the valid data, and the second address mapping table translates logical addresses to physical addresses of the temporary data.

2. The data storage device of claim 1, wherein the temporary data is data the absence of which does not cause errors in the hosting device.

3. The data storage device of claim 2, wherein the information regarding the temporary data is received in a temporary data management command sent from the hosting device.

4. The data storage device of claim 3, wherein the second address mapping table is configured after the temporary data management command is received by the controller.

5. The data storage device of claim 3, wherein the temporary data management command is received according to a vendor command transfer manner of an interface standard for interfacing the host and the controller.

6. The data storage device of claim 5, wherein the temporary data management command and an address of the temporary data are simultaneously received based on the vendor command transfer manner.

7. The data storage device of claim 1, wherein the controller includes a working memory storing the first address table and the second address table,
the controller being configured to divide the address mapping information stored in the working memory such that the first address mapping table maps one or more addresses of the valid data, and the second mapping address table maps one or more addresses of the temporary data,
the controller being configured such that the controller causes the first address mapping table to be backed up from the working memory to the storage medium periodically, and the controller does not cause the second address mapping table to be backed up from the working memory to the storage medium.

8. The data storage device of claim 7, wherein the controller includes a working memory, the first address mapping table being loaded on the working memory after a power is supplied.

9. The data storage device of claim 1, wherein the controller includes a working memory, the second address mapping table being temporarily stored in the working memory while a power is being supplied.

10. The data storage device of claim 9, wherein the second address mapping table is prevented from being loaded on the working memory after the data storage device is re-booted.

11. The data storage device of claim 1, wherein the controller is configured to search meta data of the hosting device stored in the storage medium and to extract the information regarding the temporary data from the storage medium.

12. The data storage device of claim 11, wherein the temporary data is data the absence of which does not cause errors in the hosting device.

13. The data storage device of claim 11, wherein the second address mapping table is configured after the information regarding the temporary data is extracted.

14. The data storage device of claim 11, wherein a logical address of the temporary data is determined according to the extraction result.

15. The data storage device of claim 14, wherein the controller configures the second address mapping table according to the logical address of the temporary data.

16. The data storage device of claim 11, wherein the first address mapping table is stored in the storage medium periodically.

17. The data storage device of claim 11, wherein the controller includes a working memory, the first address mapping table being loaded on the working memos after a power is supplied.

18. The data storage device of claim 11, wherein the controller includes a working memory, the second address mapping table being temporarily stored in the working memory while a power is being supplied.

19. The data storage device of claim 18, wherein the second address mapping table is prevented from being loaded on the working memory after the computing system is re-booted.

20. A computer system comprising:
a host device; and
a data storage device,
wherein the data storage device includes,
   a storage medium configured to store data; and
   a controller configured to control the storage medium, the controller including address mapping information,
   wherein the controller is configured to divide the address mapping information into at least a first address mapping table and a second address mapping table based on information regarding temporary data received from the host device, the first address mapping table being configured to map one or more addresses of valid data, and to be backed up to the storage medium, the second mapping address table being configured to map one or more addresses of the temporary data and to not be backed up to the storage medium,
wherein the first address mapping table translates logical addresses to physical addresses of the valid data, and the second address mapping table translates logical addresses to physical addresses of the temporary data.

\* \* \* \* \*